Figure 1:
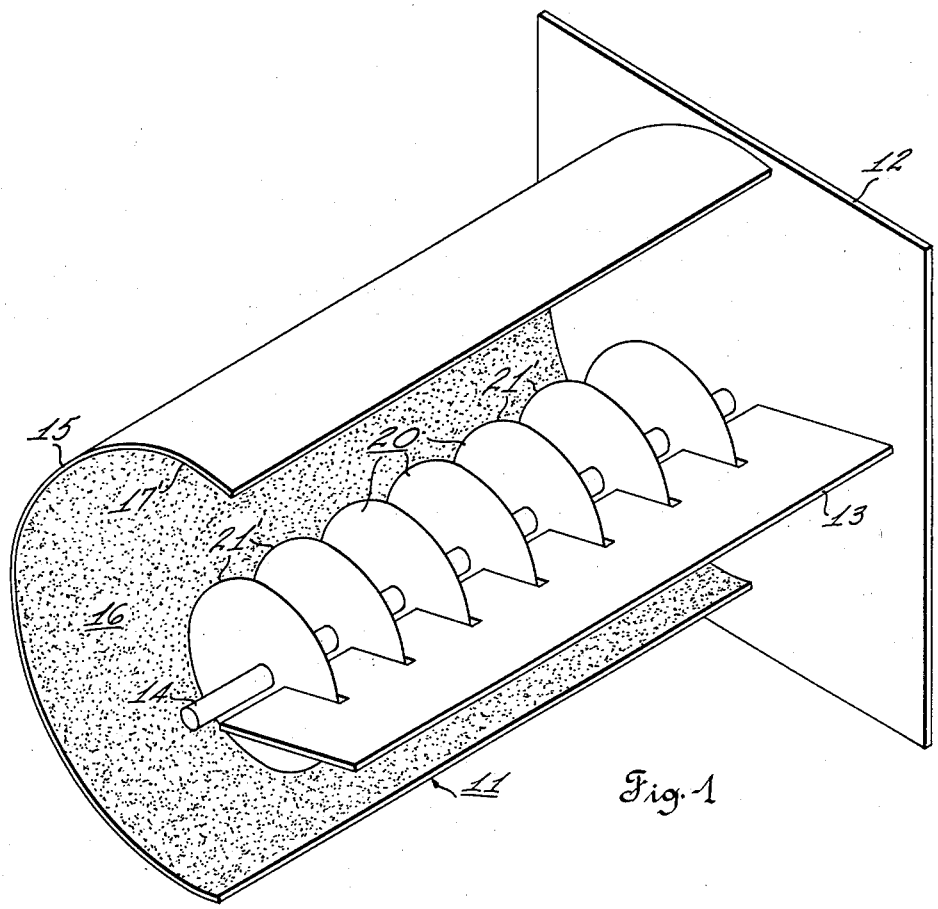

Jan. 8, 1963    B. H. FIEDLER    3,072,165
DEVICE FOR SLICING CYLINDRICAL BALES
Filed June 26, 1959

Inventor
Bruce H. Fiedler
by Richard R. Mybeck
Attorney

United States Patent Office 3,072,165
Patented Jan. 8, 1963

3,072,165
DEVICE FOR SLICING CYLINDRICAL BALES
Bruce H. Fiedler, Milwaukee, Wis., assignor to Allis-Chalmers Manufacturing Company, Milwaukee, Wis.
Filed June 26, 1959, Ser. No. 823,108
11 Claims. (Cl. 146—98)

This invention relates generally to methods and devices for cutting and more particularly to an improved method and a slicing device uniquely designed for the dissection of cylindrical bales of hay and like baleable materials.

One of today's most popular balers is the rotary baler, manufactured by the Allis-Chalmers Manufacturing Company, Milwaukee, Wisconsin, which is known and disclosed, for instance, in U.S. Patent No. 2,336,491, U. F. Luebben, December 14, 1943. These balers, sold under the trademark Roto-Baler, are especially characterized by producing and discharging rolled cylindrical bales.

Cylindrical bales, as compared to the more primitive square bales still prevalent in certain areas, are extremely advantageous in the handling of forage materials such as hay and may be rolled into bundles of varying lengths and diameters. Normally, such bales are generally approximately three to four feet in length and 14–22 inches in diameter. In the preparation of such bales, it is customary to wrap the forge material substantially completely with baling twine whereupon it becomes a unitary structure for trucking and handling in the subsequent feeding of stock.

There are many advantages attendant the formation and use of cylindrical bales which advantages include and arise because a cylindrical bale is formed by a gentle rolling and wrapping action (instead of a rough pressing action which accompanies the formation of a square bale) which enables cylindrical bales to contain more of the delicate nutritious leaves of the hay which, because of the roughness with which the hay is handled, are lost in the formation of square bales. Cylindrical bales are further advantageous because in the rain they will shed water whereas square bales will absorb water and proceed to ferment. Cylindrical bales are still further advantageous because they possess only a limited (line) ground contact when laid on the ground which permits the underlying vegetation to breathe, whereas square bales create a full surface contact with the ground thereby smothering any vegetation which may have been attempting to survive therebeneath. Because of these and other advantages, not here described, cylindrical bales have achieved extreme popularity among our farming folk.

In using cylindrical bales of the larger size, it is sometimes desired to dissect or slice the bales into smaller portions without roughing up or compressing the material or squeezing healthgiving juices therefrom.

It is therefore desirable to have a device which permits a farmer to obtain the one portion feedings for his stock (which portions may be either laid upon the fields or placed in the feed bins at the stanchions).

Accordingly, one of the prime objects of the present invention is to provide a slicing device whereby large cylindrical bales may be fed thereinto and readily dissected into a plurality of small easily handled portions capable of individual feeding to livestock, either in the field along with the baling machine or in the barn areas where bales are stored.

It is another object of the present invention to provide for cutting cylindrical bales in which the cutting is effected by a gentle rolling action without destroying, crushing or otherwise damaging the material in the bale.

It is another object of the present invention to provide a device for cutting cylindrical bales in which the bale passing therethrough is rotating and permits a gentler peripheral cut from the outside in, which provides for even, substantially uniform pressures on the bale at all times.

Another object of the present invention is to provide a slicing device which may comprise either a single or a series of rotating disks which coact with a specially contoured inner wall and the bale to roll the bale and simultaneously provide a peripheral cut of increasing depth, whereby at least a portion of the bale is dissected from the main part for subsequent handling.

Still a further object of the present invention is to provide an improved method for gently cutting cylindrical bales in which the bale is rolled and simultaneously receives a peripheral cut of gradually increasing depth until the bale is dissected.

These and still further objects as shall hereinafter appear are fulfilled by the present invention in a manner which may be readily discerned from the following detailed description particularly when read in conjunction with the attached drawing.

Figure 2:
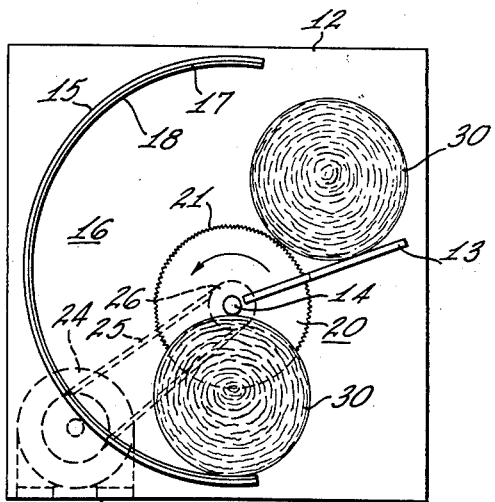

In the drawing:

FIG. 1 is an isometric showing of a slicing device embodying the present invention with certain parts being removed for clarity; and FIG. 2 is an end elevation with parts removed for clarity of a cutting device embodying the present invention.

In the drawing, one embodiment of a device of the type described is indicated by the general numeral 11 and comprises an end board or wall 12 and an identical wall at the other end of the machine (not shown) to which is connected a guard plate 13. A driven shaft 14 is respectively journaled in suitable bearings (not shown) mounted in the end walls for rotation relative thereto in the conventional manner.

A curved wall member 15 extends slightly over halfway around the shaft 14 and is disposed eccentrically relative thereto to define a generally diminishing chamber 16 therewith. Curved wall member 15 is secured to end board 12 and its counterpart at the other end of the machine (not shown) in any suitable manner such, for example, as by welding. This assembly is supported by the end walls themselves although it also may be supported from beneath by conventional channel irons or other supporting means.

Chamber 16, defined in part by inner surface 17 of member 15, has an inner lining 18 of rubberlike material, having a relatively high coefficient of friction which is adherently secured thereto (see FIG. 2) for a purpose which shall be more fully explained. As a variant, the inner surface may be used without the lining and, instead, provided with a roughed surface (see at 17' in FIG. 1) such, for example, as by spiking and the like, which also provides a friction surface.

Shaft 14 may be driven in any suitable fashion such, for example, as with a motor 24 directly linked thereto or coupled therewith as with V-belts 25 reeved about pulley means 26 mounted to a protruding end of the shaft 14, or in any other suitable fashion.

Shaft 14 carries a plurality of substantially identical rotating disklike knives 20, which are mounted in a preselected spatial relationship to each other along shaft 14. Knives 20 may be secured to shaft 14 in any conventional fashion such, for example, as with key ways or retaining screws. The blade edges of knives 20 may either be beveled as shown at 21' in FIG. 1 or serrated as shown at 21 in FIG. 2.

My improved method of cutting these cylindrical bales precludes a densification of the baled material during cutting as would normally occur in a straight through cut involving downward pressure. Essentially, my method comprises simultaneously rolling and cutting the bale while gradually increasing the depth of the cut as passing the rotating bale through an eccentric chamber containing cutting means. Thus, the cut is peripheral and gentle, and the depth of cut gradually increases around the periphery thereof until ultimately the cut extends from the outside to the center of the bale.

In operation, a cylindrical bale 30 is placed upon plate 13 and fed into the feed opening, that is, the largest dimension of chamber 16, either by hand or by other suitable means, whereupon the bale encounters rotating blades 20 which are rotating in a counterclockwise direction as shown in FIG. 2 in response to the actuated motor 24. Rotating blades 20 actuate the bale 30 into a rolling action whereupon the knife edge 21 commences to gently cut into the bale. After it advances but a short distance, bale 30 encounters the friction of the inner surface 17 of member 15 and is further simultaneously induced to rotation and gently urged toward shaft 14. By bale rotation, the cut is maintained peripheral. By the gradually decreasing dimension of the chamber, the cut is gently promoted to increasing depth. As the bale reaches the down side of chamber 15, the bale is cut completely through.

Adjusting means may be provided whereby the relative position of the bottom edge of the plate and the shaft carrying the blade may be adjusted to conform to bales of various diameters, it being desired that the distance between the outer surface of shaft 14 and the cutting edge 21 on the outer periphery of the knife disk 20 substantially equals at least one-half the diameter of the bale being handled.

While only one embodiment and some modifications of the present invention are herein described and illustrated, it is of course understood that such other changes and modifications as may readily occur to one skilled in the art confronted with the present teachings are likewise intended within the spirit of the present invention which embraces the novel concepts of providing means and methods of simultaneously rolling and peripherally cutting inwardly a cylindrical bale and is more particularly defined by the appended claims.

Having now particularly described and ascertained the nature of my said invention and the manner in which it is to be performed, I declare that what I claim is:

1. A device for cutting cylindrical bales comprising: a support; a shaft journaled in and carried by said support and rotatable relative thereto; a plurality of disk knives carried by said shaft in axial spaced relationship to each other; and a generally hemicylindrical wall member mounted to said support axially with said shaft in fixed generally eccentric relationship thereto and defining a chamber therewith, said wall member having a frictionized inner surface coactable with said knives upon cylindrical bales fed into the chamber while said shaft is rotating to roll said bales upon said inner surface and urge said bales toward said shaft to provide said bale with a peripheral cut of gradually increasing depth until the bales, upon reaching the smallest distance between said eccentrically mounted wall member and said shaft, are substantially completely severed.

2. A device for cutting cylindrical bales comprising: a support; a substantially horizontal rotatable shaft journaled in and carried by said support and rotatable relative thereto; a plurality of disk knives carried by said shaft in axial spaced relationship to each other; and a generally hemicylindrical wall member mounted to said support axially with said shaft in fixed generally eccentric relationship thereto and defining a chamber therewith, said wall member having a high friction inner lining bonded thereto coactable with said knives upon cylindrical bales fed into the chamber while said shaft is rotating to roll said bales upon said inner lining and urge said bales toward said shaft to provide said bales with a peripheral cut of gradually increasing depth until the bales, upon reaching the smallest distance between said lining and said shaft, are substantially completely severed.

3. A device for cutting cylindrical bales comprising: a support; a substantially horizontal rotatable shaft journaled in and carried by said support and rotatable relative thereto; a plurality of disk knives carried by said shaft in axial spaced relationship to each other and having a serrated peripheral cutting edge; and a generally hemicylindrical wall member mounted to said support axially with said shaft in fixed generally eccentric relationship thereto and defining a chamber therewith, said wall member having a frictionized inner surface coactable with said knives upon cylindrical bales fed into the chamber while said shaft is rotating to roll said bales upon said inner surface and urge said bales toward said shaft to provide said bales with a peripheral cut of gradually increasing depth until the bales, upon reaching the smallest distance between said eccentrically mounted wall member and said shaft, are substantially completely severed.

4. A device for cutting cylindrical bales comprising: a support; a substantially horizontal rotatable shaft journaled in and carried by said support and rotatable relative thereto; a plurality of disk knives carried by said shaft in axial spaced relationship to each other; and a generally hemicylindrical wall member mounted to said suppport axially with said shaft in fixed generally eccentric relationship thereto and defining a chamber therewith, said wall member having a frictionized inner surface coactable with said knives upon cylindrical bales fed into the chamber while said shaft is rotating to roll said bales upon said inner surface and urge said bales toward said shaft to provide said bale with peripheral cut of gradually increasing depth until the bales, upon reaching the smallest distance between said eccentrically mounted wall member and said shaft, are substantially completely severed.

5. A device for cutting cylindrical bales comprising: a supporting structure having a pair of substantially parallel end walls in spaced relationship to each other and a hemicylindrical wall member mounted between said end walls; a shaft journaled in and extending between said end walls and rotatable relative thereto, said shaft being mounted axially with said wall member in fixed generally eccentric relationship thereto and defining a chamber therewith having a maximum dimension adjacent the top thereof and gradually decreasing to a minimum dimension adjacent the bottom thereof, said wall member having a frictionized inner surface; a plurality of cutting disks carried by and axially spaced along said shaft intermediate said end walls; and means for rotating said shaft whereby cylindrical bales fed into the chamber at said maximum dimension are rolled upon said inner surface by the coaction of said cutting disks and said frictionized surface and gently sliced with a peripheral cut of gradually increasing depth until the bales, upon reaching said minimum dimension of said chamber, are substantially completely severed.

6. A device according to claim 5 in which the minimum dimension of said chamber between said shaft and said surface equals at least one-half the diameter of said bale.

7. A device for cutting cylinderical bales comprising: support means; a plurality of rotatable cutting disks carried by said support means in axial spaced relationship to each other; a generally hemicylindrical wall member disposed axially with said cutting disks in fixed generally eccentric relationship thereto and defining a chamber therewith, said chamber having a gradually decreasing dimension of from at least equal the diameter of said cylindrical bales above said disks to not more than one-half the diameter of said bales beneath said disks, said wall member having a frictionized inner surface; and means for rotating said disks for coaction with said inner surface upon cylindrical bales fed into the maximum dimension of said chamber while said disks are rotating to roll said bales upon said inner surface and slice said bales with a peripheral cut of gradually increasing depth until the bales, upon reaching the minimum dimension of said chamber, are substantially completely severed.

8. A device for cutting cylindrical bales comprising: a support means; a plurality of rotatable cutting disks carried by said support means in axial spaced relationship to each other and rotatable relative thereto; a generally hemicylindrical wall member disposed axially with said cutting disks in fixed generally eccentric relationship thereto and having a rubber lined inner surface disposed with a gradually decreasing dimension of from a maximum of at least approximately the diameter of said cylindrical bales above said disks to a minimum of not more than one-half the diameter of said bales beneath said disks; and means for rotating said disks for coaction with said inner surface upon cylindrical bales fed thereinto at said maximum dimension while said disks are rotating to roll said bales upon said inner surface and slice said bales with a peripheral cut of gradually increasing depth until the bales, upon reaching said minimum dimension, are substantially completely severed.

9. A device for slicing cylindrical bales comprising: support means; a wall member carried by said support means and having a frictionized concave surface; and rotatable cutting means disposed in fixed eccentric relationship to said concave surface for rotating a cylindrical bale upon said frictionized surface, and, while said bale is rotating, for peripherally slicing said bale toward said surface with a cut of gradually increasing depth until said bale is substantially completely severed.

10. A device for slicing cylindrical bales comprising: a wall member having a frictionized concave surface; and means disposed in fixed eccentric relationship to said concave surface for rotating a cylindrical bale upon said surface and, while said bale is rotating, peripherally slicing said bale with a cut of gradually increasing depth until said bale is dissected, said last recited means comprise a disk knife rotating about fixed axis in a chamber defined by said wall member, said wall member having a frictionized inner surface disposed eccentrically about said axis and decreasing in spaced relationship to said axis from top to bottom.

11. A device for slicing cylindrical bales comprising: support means having a wall member having a frictionized concave inner surface; and rotatable cutting means carried by said support means in eccentrically disposed relationship to said inner surface and coacting therewith to guide a cylindrical bale, rolling upon said surface, between said means and said member and to peripherally slice said bale toward said member with a cut increasing in depth to the center of said bale whereupon said bale is severed.

References Cited in the file of this patent

UNITED STATES PATENTS

| | | |
|---|---|---|
| 926,241 | Chesebro | June 29, 1909 |
| 1,259,213 | Crawford | Mar. 12, 1918 |
| 1,747,461 | Vaughan | Feb. 18, 1930 |
| 1,936,025 | Mahaffey | Nov. 21, 1933 |
| 2,067,566 | Field | Jan. 12, 1937 |
| 2,335,710 | Townsend | Nov. 30, 1943 |
| 2,745,453 | Perrelli et al. | May 15, 1956 |

FOREIGN PATENTS

| | | |
|---|---|---|
| 956,180 | Germany | Jan. 17, 1957 |